June 20, 1967 A. W. PICKERING 3,326,522
REVERSIBLE, INWARD FLOW, INDEPENDENT POWER TURBINE
Filed June 1, 1965 3 Sheets-Sheet 1

INVENTOR:—
ALBERT WILLIAM PICKERING

United States Patent Office 3,326,522
Patented June 20, 1967

---

3,326,522
REVERSIBLE, INWARD FLOW, INDEPENDENT POWER TURBINE
Albert William Pickering, Coventry, England, assignor to Bristol Siddeley Engines Limited, Bristol, England
Filed June 1, 1965, Ser. No. 460,414
Claims priority, application Great Britain, June 5, 1964, 23,376/64
6 Claims. (Cl. 253—23)

ABSTRACT OF THE DISCLOSURE

A reversible inward flow turbine having a ring of pivotally-mounted nozzle-defining members arranged circumferentially around the rotor and swivellable simultaneously to change the speed or direction of rotation of the rotor. Each member has a passage therein shaped to form a nozzle directed towards the periphery of the rotor and is sealingly engaged with the members adjacent it in all angular positions of the members, thereby ensuring that working fluid can only pass to the rotor via the passages in the members.

---

Figure 1:
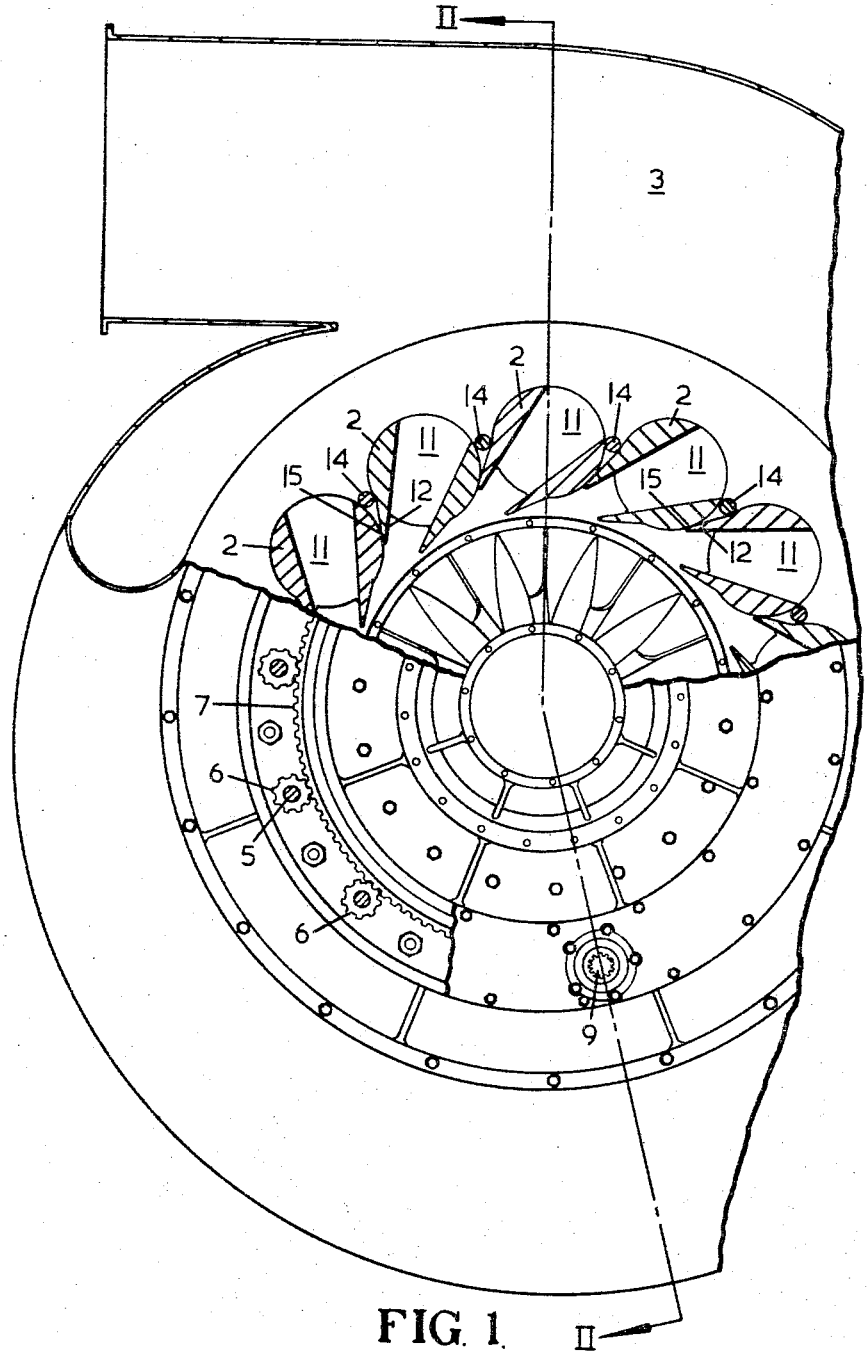

The invention relates to a reversible, inward flow, independent power turbine of the kind comprising a rotor, a plurality of nozzle-defining members arranged circumferentially around the rotor, each member being pivotally-mounted about an axis parallel to the rotor axis and having a passage therein extending transversely to its pivotal axis, the passage being open at its radially-outer end to the turbine inlet and at its radially-inner end to the periphery of the rotor and being shaped to form a nozzle directed towards the rotor, and operating means operable to turn all the members simultaneously about their pivots.

According to the invention, the turbine also includes means capable of forming a seal between each pair of adjacent members at all angular positions thereof, thereby preventing working fluid from passing otherwise than through the passages within the members.

The members may be spaced apart circumferentially around the rotor, the sealing means comprising a sealing element located between the adjacent outer surfaces of each pair of adjacent members and in engagement with said surfaces for all angular positions of said members.

Alternatively the members may abut each other, the sealing means then comprising a portion of each of the adjacent outer surfaces of each pair of adjacent members, each said portion being convexly curved about the pivotal axis of the respective member, thereby to remain in substantially sealing engagement with the abutting portion for all angular positions of said members.

Where there is a sealing element between each pair of adjacent members, each sealing element may either be a fixed cylindrical pin or a freely-rotatable cylindrical roller mounted with its longitudinal axis parallel with and intermediate the axes of the members, the cylindrical surface of the pin or roller being engaged by a convex surface of each member and of sufficient axial length to form the seal between the members.

Also where there is a sealing element between each pair of adjacent members, each member may comprise a cylindrical portion supported by a pair of trunnions, extending axially one from each end thereof to provide the pivotal mounting, the cylindrical portion having a passage extending therethrough transversely of its longitudinal axis, the side walls of the passage being extended at their radially-inner ends by projections from the cylindrical surface of the cylindrical portion. The projections may be so shaped that in one extreme angular position of the members, the radially-inner end of one of the projections of each member is engaged against the cylindrical surface of the adjacent member at its one side, and in the other extreme angular position, the radially-inner end of the other of the projections of each member is engaged against the cylindrical surface of the adjacent member at its other side, thereby providing additional seals.

Figure 2:
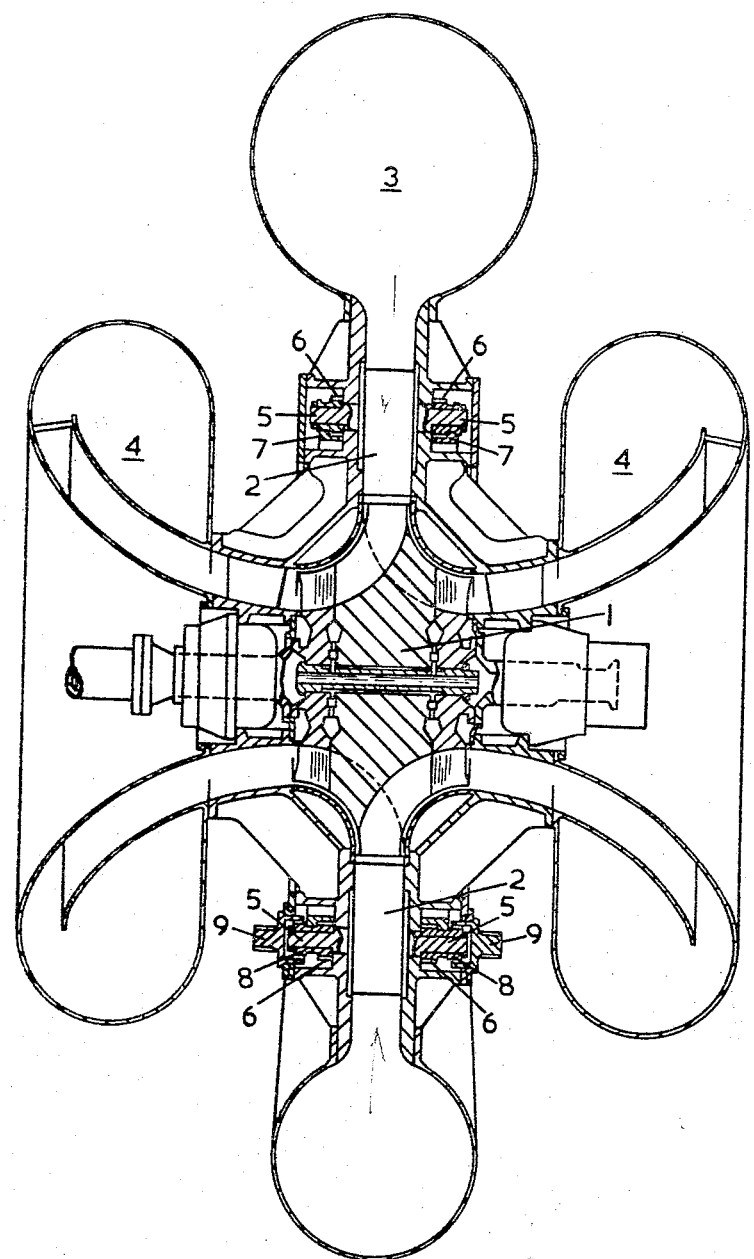

By way of example, a reversible, inward flow, independent power turbine in accordance with the invention will now be described with reference to the accompanying drawings in which:

FIGURE 1 is a part sectional end view of the turbine;
FIGURE 2 is an axial section through the turbine on the line II—II in FIGURE 1; and
FIGURE 3 is a perspective view of a nozzle-defining member as used in the turbine shown in FIGURES 1 and 2.

The turbine includes a double-sided radial flow rotor 1, to the periphery of which working fluid is introduced, via a plurality of nozzle-defining members 2, from an inlet volute chamber 3. The axially facing ends of the flow passages in the rotor 1 lead to respective outlet chambers 4. Working fluid from the inlet volute chamber 3 will pass through the flow passages of the members 2 and will flow through the rotor 1 to one or other of the outlet chambers 4. The members 2 are pivotally-mounted on trunnions 5 for angular adjustment simultaneously between two extreme positions, as will hereinafter be described, in order to change the outlet angle of the working fluid and thereby to change the direction of rotation of the rotor. The trunnions 5 carry gear wheels 6 which are engaged by annular racks 7 positioned one at each end of the rotor. Each rack 7 is adjustable circumferentially by means of a gear wheel coupling 8 of which one part is integral with one of the gear wheels 6 and the other part is arranged to be turned by a stub-shaft 9, thereby to turn the gear wheels 6 simultaneously and to alter the inclination of the members 2.

Figure 3:
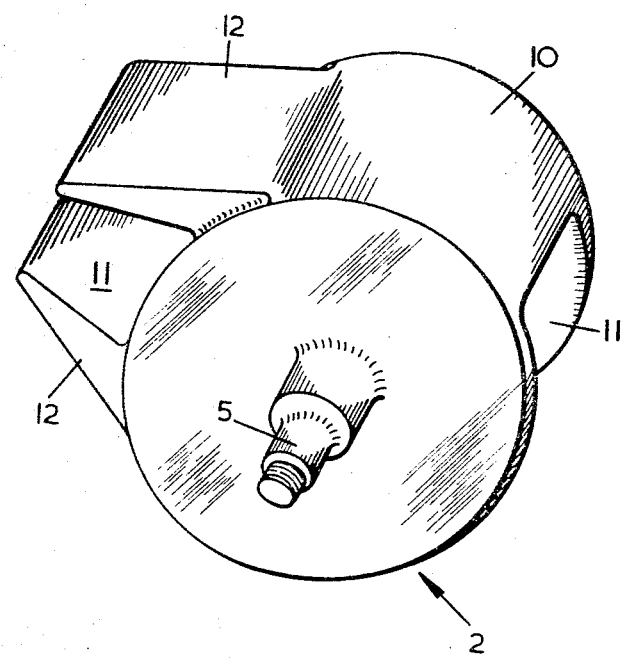

Turning now to FIGURE 3, each member 2 comprises a cylindrical portion 10 from the ends of which extend the trunnions 5. A flow passage 11 passes transversely to the axes of the trunnions 5 through the cylindrical portion 10. The walls of the flow passage 11 are formed at their radially-inner ends by a pair of spaced projections 12, extending from the cylindrical surface of the portion 10. The flow passage 11 is convergent from its radially-outer to its radially-inner end.

Referring again to FIGURE 1, the members 2 are circumferentially spaced around the rotor 1 and there is a cylindrical pin 14 mounted between each pair of adjacent members 2 with its longitudinal axis parallel with the axes of the latter. The cylindrical surface of each pin 14 engages the cylindrical surface of each of the two adjacent members 2. The axial length of each pin 14 is substantially equal to the axial length of the cylindrical portions 10 of the members 2 so that a seal is formed therebetween. As the members 2 are turned about their axes by operating the racks 7, the cylindrical surfaces of the members 2 remain in sealing engagement with the cylindrical surfaces of the intermediate pins 14 and so the seals are maintained, thereby preventing working fluid from passing otherwise than through the passages 11. In one extreme position, as shown in FIGURE 1, one of the projections 12 of each member 2 abuts against the cylindrical surface of the adjacent member 2 at 15. This provides an additional seal against leakage of working fluid between the members 2. In the other extreme position, the others of the projects 12 will likewise engage adjacent members 2, thereby providing a similar additional seal.

As each flow passage 11 constitutes a complete nozzle, the cross-sectional area of each nozzle will remain unaltered as the angles of inclination of the flow passages are altered, which is not so where the nozzles are defined between pairs of adjacent variable angle guide vanes, as is usually the practice. In view of this feature and by virtue of the seal provided by the pins 14, the members 2 can be moved from one extreme position to the other, when the direction of rotation of the power turbine is to be changed, without there being any substantial effect on the operation of an engine or other gas producer, supplying working fluid to the power turbine.

Instead of the sealing elements being fixed pins, they may be rollers each mounted for free rotation about an axis parallel with the axes of the members 2.

In another possible arrangement, not employing the pins 14 or equivalent rollers, the members 2 may be cylindrical, i.e., they do not have the projections 12, thereby making it possible for them to be arranged closely together around the rotor with their cylindrical surfaces in substantially sealing engagement for all angular positions of the members.

What I claim as my invention and desire to secure by Letters Patent of the United States is:

1. A reversible, inward flow, independent power turbine comprising a rotor, a plurality of nozzle-defining members arranged circumferentially around the rotor, each member being pivotally-mounted about an axis parallel to the rotor axis and having a passage therein extending transversely to its pivotal axis, said passage being open at its radially-outer end to the turbine inlet and at its radially-inner end to the periphery of said rotor and being shaped to form a nozzle directed towards said rotor, operating means operable to turn all said members simultaneously about their pivots, and sealing means between each pair of adjacent members and effective at all angular positions thereof, each said sealing means comprising a cylindrical pin mounted with its longitudinal axis parallel with and intermediate the axes of each pair of adjacent members, the cylindrical surface of said pin being engaged by a convex surface of each adjacent member and of sufficient axial length to form the seal between said adjacent members.

2. A reversible, inward flow, independent power turbine comprising a rotor, a plurality of nozzle-defining members spaced apart circumferentially around the rotor, each member being pivotally-mounted about an axis parallel to the rotor axis and having a passage therein extending transversely to its pivotal axis, said passage being open at its radially-outer end to the turbine inlet and at its radially-inner end to the periphery of said rotor and being shaped to form a nozzle directed towards said rotor, operating means operable to turn all said members simultaneously about their pivots, and sealing means between each pair of adjacent members and effective at all angular positions thereof, said sealing means comprising a plurality of freely-rotatable cylindrical rollers, each mounted with its longitudinal axis parallel with and intermediate the axes of each pair of adjacent members, the cylindrical surface of each roller being engaged by a convex surface of each adjacent member and of sufficient axial length to form the seal between said adjacent members.

3. A reversible, inward flow, independent power turbine comprising a rotor, a plurality of nozzle-defining members spaced apart circumferentially around the rotor, each member being pivotally-mounted about an axis parallel to the rotor axis and having a passage therein extending transversely to its pivotal axis, said passage being open at its radially-outer end to the turbine inlet and at its radially-inner end to the periphery of said rotor and being shaped to form a nozzle directed towards said rotor, operating means operable to turn all said members simultaneously about their pivots, and sealing means between each pair of adjacent members, said sealing means comprising a sealing element located between the adjacent outer surfaces of each pair of adjacent members and in engagement with said surfaces for all angular positions of said members and each member comprising a cylindrical portion supported by a pair of trunnions, extending axially one from each end thereof to provide said pivotal mounting, the cylindrical portion having a passage extending therethrough transversely of its longitudinal axis, and projections from the cylindrical surface of said cylindrical portion, said projections forming extensions of the side walls of said passage.

4. A turbine as claimed in claim 3 in which said projections are of such shape that in one extreme angular position of the members, the radially-inner end of one of the projections of each member is engaged against the cylindrical surface of the adjacent member at its one side, and in the other extreme angular position, the radially-inner end of the other of the projections of each member is engaged against the cylindrical surface of the adjacent member at its other side, thereby providing additional seals.

5. A reversible, inward flow, independent power turbine comprising a rotor, a plurality of nozzle-defining members arranged circumferentially around the rotor, each member being pivotally-mounted about an axis parallel to the rotor axis and having a passage therein extending transversely to its pivotal axis, said passage being open at its radially-outer end to the turbine inlet and at its radially-inner end to the periphery of said rotor and being shaped to form a nozzle directed toward said rotor, operating means operable to turn all said members simultaneously about their pivots, and sealing means between each pair of adjacent members, said sealing means comprising a portion of each of the adjacent outer surfaces of each pair of adjacent members, each said portion being convexly curved about the pivotal axis of the respective member, thereby to remain in substantially sealing engagement with the abutting portion for all angular positions of said members.

6. A turbine as claimed in claim 5 in which said members are cylindrical and each is arranged with its cylindrical surface in substantially sealing engagement with the cylindrical surfaces of said adjacent members.

References Cited

UNITED STATES PATENTS

| | | | |
|---|---|---|---|
| 1,078,170 | 11/1913 | Shaw | 253—137 |
| 1,154,777 | 9/1915 | Kieser | 253—78 |
| 1,228,897 | 6/1917 | Frame | 253—137 |
| 3,189,321 | 6/1965 | Devillard et al. | 253—78 |

MARTIN P. SCHWADRON, *Primary Examiner.*

EVERETTE A. POWELL, JR., *Examiner.*